(12) United States Patent
Liu

(10) Patent No.: US 12,651,764 B2
(45) Date of Patent: Jun. 9, 2026

(54) WINDING AND UNWINDING DEVICE AND BATTERY PRODUCTION SYSTEM

(71) Applicant: CONTEMPORARY AMPEREX TECHNOLOGY (HONG KONG) LIMITED, Hong Kong (CN)

(72) Inventor: Yu Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 309 days.

(21) Appl. No.: 18/462,889

(22) Filed: Sep. 7, 2023

(65) Prior Publication Data

US 2024/0072291 A1     Feb. 29, 2024

Related U.S. Application Data

(63) Continuation of application No. PCT/CN2023/090637, filed on Apr. 25, 2023.

(30) Foreign Application Priority Data

Aug. 26, 2022     (CN) .......................... 202222265573.X

(51) Int. Cl.
*H01M 10/00* (2006.01)
*H01M 10/04* (2006.01)
(52) U.S. Cl.
CPC ............................... *H01M 10/0409* (2013.01)
(58) Field of Classification Search
CPC ........ B65H 2402/352; B65H 2403/724; B65H 2403/7255; B65H 2408/23152;
(Continued)

(56) References Cited

U.S. PATENT DOCUMENTS

2020/0220198 A1* 7/2020 Sale ...................... H01G 11/84

FOREIGN PATENT DOCUMENTS

CN      101524913 A      9/2009
CN      101524913 B      5/2011
(Continued)

OTHER PUBLICATIONS

International Search Report for International Application PCT/CN2023/090637, dated Jun. 24, 2023.
(Continued)

*Primary Examiner* — Emmanuel M Marcelo
(74) *Attorney, Agent, or Firm* — Ladas & Parry LLP

(57) ABSTRACT

This application provides a winding and unwinding device and a battery production system. The winding and unwinding device includes a turret, a driver, and a magnetic powder clutch. The turret includes a rotation shaft and at least one winding shaft, the rotation shaft being parallel to the winding shaft. A drive shaft of the magnetic powder clutch is connected to the driver and a driven shaft of the magnetic powder clutch is connected to the rotation shaft of the turret, such that the driver drives the rotation shaft of the turret to rotate. In this application, with the magnetic powder clutch disposed between the turret and the driver, after the turret rotates to a predetermined position, the rotation of the turret can be stopped without the need to cut off the power supply, ensuring the normal operation of the driver when the turret stops rotation, thus avoiding damage to the driver.

7 Claims, 6 Drawing Sheets

(58) Field of Classification Search
CPC ........... B65H 2801/72; B65H 19/2215; H01M
10/0431; H01M 10/0587; Y02P 70/50
See application file for complete search history.

(56) References Cited

FOREIGN PATENT DOCUMENTS

| | | | |
|------|-------------|---|--------|
| CN | 114014076 | A | 2/2022 |
| CN | 218491036 | U | 2/2023 |
| FR | 1154743 | A | 4/1958 |
| GB | 1516381 | A | 7/1978 |
| JP | S57141343 | A | 9/1982 |

OTHER PUBLICATIONS

Extended European Search Report for EP application No. 23772394.
5, dated Feb. 27, 2025.

\* cited by examiner

WINDING AND UNWINDING DEVICE AND BATTERY PRODUCTION SYSTEM

CROSS-REFERENCE TO RELATED APPLICATIONS

This application is a continuation of International Patent Application No. PCT/CN2023/090637, filed on Apr. 25, 2023, which claims priority to Chinese Patent Application No. 202222265573.X, filed on Aug. 26, 2022. The afore-mentioned patent applications are incorporated herein by reference in their entirety.

TECHNICAL FIELD

This application relates to the technical field of battery production devices, and in particular, to a winding and unwinding device and a battery production system.

BACKGROUND

With the rapid development of the lithium battery indus-try, increasingly high requirements are imposed on the production efficiency of cells. The cells are usually formed by winding the electrode plates. In the process of preparing the traction battery cells, a roll of the electrode plate material needs to be wound and unwound using the winding and unwinding device, such that the electrode plate is processed accordingly by the downstream processing device.

At present, the winding and unwinding device in the rolling and slitting machine employs a flip motor plus a speed reducer, so that the turret can slowly replace a roll. To implement the balance of the turret when it is stopped, an electromagnetic brake is used to lock the spindle of the turret. In this case, the power supply needs to be cut off for stopping the turret, and the turret slides after losing the torque provided by the motor, and thus is difficult to locate, causing adverse effects on the winding or unwinding.

SUMMARY

This application is intended to resolve at least one of the technical problems in some cases. Therefore, an objective of this application is to provide a winding and unwinding device and a battery production system, such that after rotating to a predetermined position, the turret stops moving without the need to cut off the power supply, thus imple-menting the normal operation of the driver when the turret is fixed, avoiding damage to the driver.

According to an embodiment of a first aspect of this application, a winding and unwinding device is provided, including a turret including a rotation shaft and at least one winding shaft, the rotation shaft being parallel to the wind-ing shaft; a driver; and a magnetic powder clutch, where a drive shaft thereof is connected to the driver, and a driven shaft thereof is connected to the rotation shaft of the turret, such that the driver drives the rotation shaft of the turret to rotate.

In the technical solution of this embodiment of this application, with the magnetic powder clutch disposed between the turret and the driver, after the turret rotates to a predetermined position, the movement of the turret can be stopped without the need to cut off the power supply, such that the driver can still normally rotate when the turret is fixed, thus avoiding damage to the driver.

In some embodiments, the winding and unwinding device further includes a controller, the controller electrically or communicatively connected to the magnetic powder clutch, and configured to control excitation current input to the magnetic powder clutch. In these embodiments, with the controller disposed in the winding and unwinding device, the magnitude of a transmitted torque can be controlled via the magnetic powder clutch by using an excitation direct current.

In some embodiments, the turret further includes a con-nection bracket connecting the at least one winding shaft to the rotation shaft, the at least one winding shaft being rotatable with respect to the connection bracket. In these embodiments, the connection bracket being disposed on the turret allows the winding shaft on the connection bracket to revolve around the rotation shaft of the turret, facilitating the winding and unwinding operations.

In some embodiments, the driver is connected to the drive shaft of the magnetic powder clutch via a chain, a belt, or a gear. In these embodiments, the driver being connected to the drive shaft of the magnetic powder clutch allows the driver to drive the magnetic powder clutch.

In some embodiments, the winding and unwinding device further includes: a fixed disk fixed to the rotation shaft of the turret; and a stop member movable between a first position and a second position, where in the first position, the stop member is engaged with the fixed disk to stop the fixed disk from rotating, so as to stop the rotation shaft of the turret from rotating; and in the second position, the stop member disengages from the fixed disk, to allow rotation of the fixed disk, so as to allow rotation of the rotation shaft of the turret. In these embodiments, the fixed disk and the stop member being disposed on the winding and unwinding device can reliably stop the movement of the turret, avoiding slippage of the turret. This is conducive to accurately locating the turret.

In some embodiments, the stop member includes at least one stop cylinder, and the fixed disk includes a hole for accommodating a protrudable portion of the stop cylinder, where, in the first position, the protrudable portion of the stop cylinder is accommodated in the hole; and in the second position, the protrudable portion of the stop cylinder disen-gages from the hole. In these embodiments, the stop member is provided with the at least one stop cylinder and the fixed disk is provided with the hole for accommodating the protrudable portion of the stop cylinder, so that the rotation of the fixed disk can be controlled flexibly.

In some embodiments, the winding and unwinding device includes a pair of stop cylinders parallel to a rotation axis of the rotation shaft and disposed on two sides of the rotation axis. In these embodiments, with the pair of stop cylinders disposed on two sides of the rotation axis in the winding and unwinding device, the movement of the turret can be con-trolled more reliably. This is conducive to accurately locat-ing the turret.

In some embodiments, the pair of stop cylinders are symmetrically disposed on two sides of the rotation axis. In these embodiments, with the pair of stop cylinders sym-metrically disposed on two sides of the rotation axis, sym-metrical resistance can be applied to the fixed disk.

In some embodiments, the controller is further electrically or communicatively connected to the stop member, to con-trol the stop member to move between the first position and the second position. In these embodiments, the controller is electrically or communicatively connected to the stop mem-ber, so that the controller can control the stop member, further helping to accurately locate the turret.

According to an embodiment of a second aspect of this application, a battery production system is provided, including the winding and unwinding device in the foregoing embodiments.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

In the accompanying drawings, unless otherwise specified, the same reference numerals in multiple drawings indicate the same or similar components or elements. These accompanying drawings may not necessarily be drawn to scale. It should be understood that these accompanying drawings illustrate only some embodiments according to the present disclosure and should not be construed as limitations on the scope of this application. To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
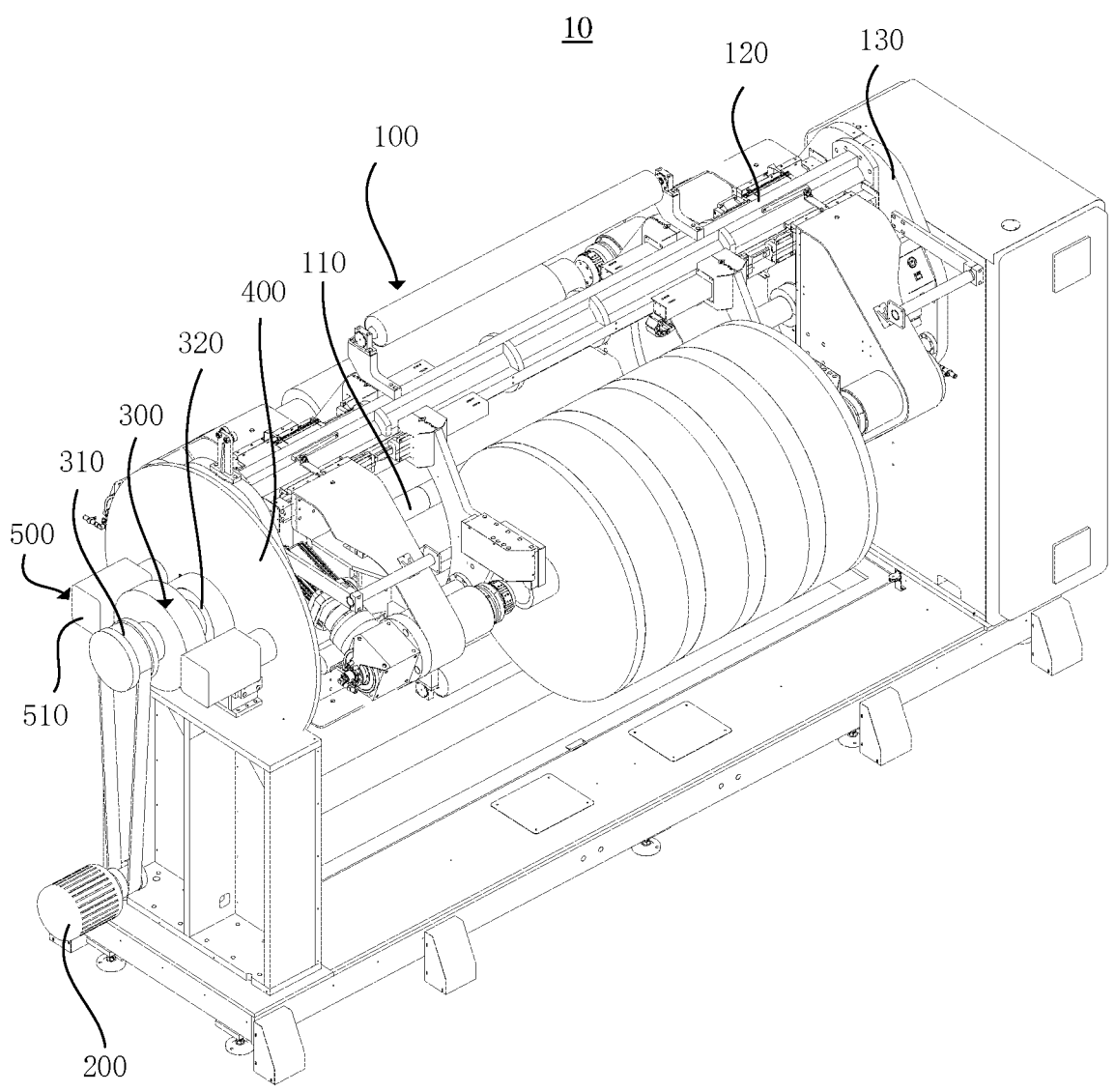
FIG. 1 is a schematic structural diagram of a winding and unwinding device according to some embodiments of this application.

DESCRIPTION OF REFERENCE NUMERALS IN THE ACCOMPANYING DRAWINGS winding and unwinding device 10;
turret 100;
driver 200;
magnetic powder clutch 300;
fixed disk 400;
stop member 500;
housing 600;
rotation shaft 110;
winding shaft 120;
connection bracket 130;
drive shaft 310;
driven shaft 320;
hole 410; and
stop cylinder 510.

DETAILED DESCRIPTION

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "have", and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, particular sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various positions in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only for describing an associative relationship of associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from a perspective of the market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing. With the rapid development of the lithium battery industry, increasingly high requirements are imposed on the production efficiency of cells. In the process of preparing the traction battery cells, a roll of the electrode plate material needs to be wound and unwound using a winding and unwinding device, such that the electrode plate is processed accordingly by a downstream processing device.

The applicant has noted that at present, the winding and unwinding device used in, for example, a rolling and slitting machine employs a flip motor plus a speed reducer, so that the turret can slowly replace a roll. After the turret rotates to a predetermined position, to implement the balance of the turret when it needs to be stopped, an electromagnetic brake is typically used to lock the spindle of the turret. However, the power supply needs to be cut off when the flip motor plus the speed reducer is used to stop the movement of the turret, and the turret slides after losing the torque provided by the motor, and thus is difficult to accurately locate. In addition, when the electromagnetic brake is used to lock the spindle of the turret for stopping movement, the turret shakes, causing adverse effects on unwinding.

To resolve the foregoing problem in some cases, the applicant has found through research that a turret, a driver, and a magnetic powder clutch can be disposed on the winding and unwinding device, such that after rotating to a predetermined position, the turret can stop moving without the need to cut off the power supply, thus implementing the normal operation of the driver (for example, a motor) when the turret is fixed, avoiding damage to the driver.

The winding and unwinding device in this application is applicable to various scenarios where it is necessary to wind or unwind sheet materials, such as various battery production systems.

Figure 2:
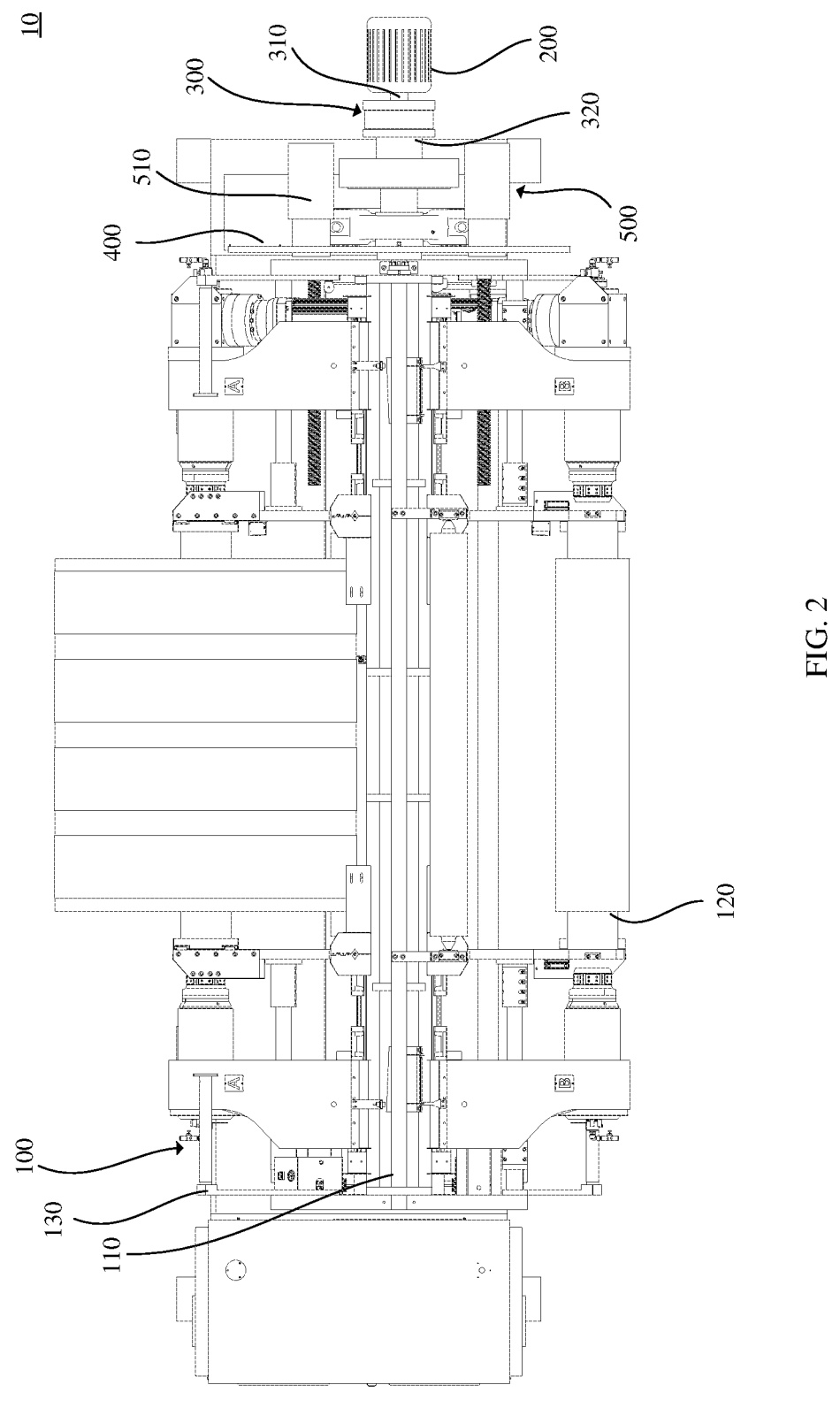
FIG. 2 is a top view of a winding and unwinding device according to some embodiments of this application.
Figure 3:
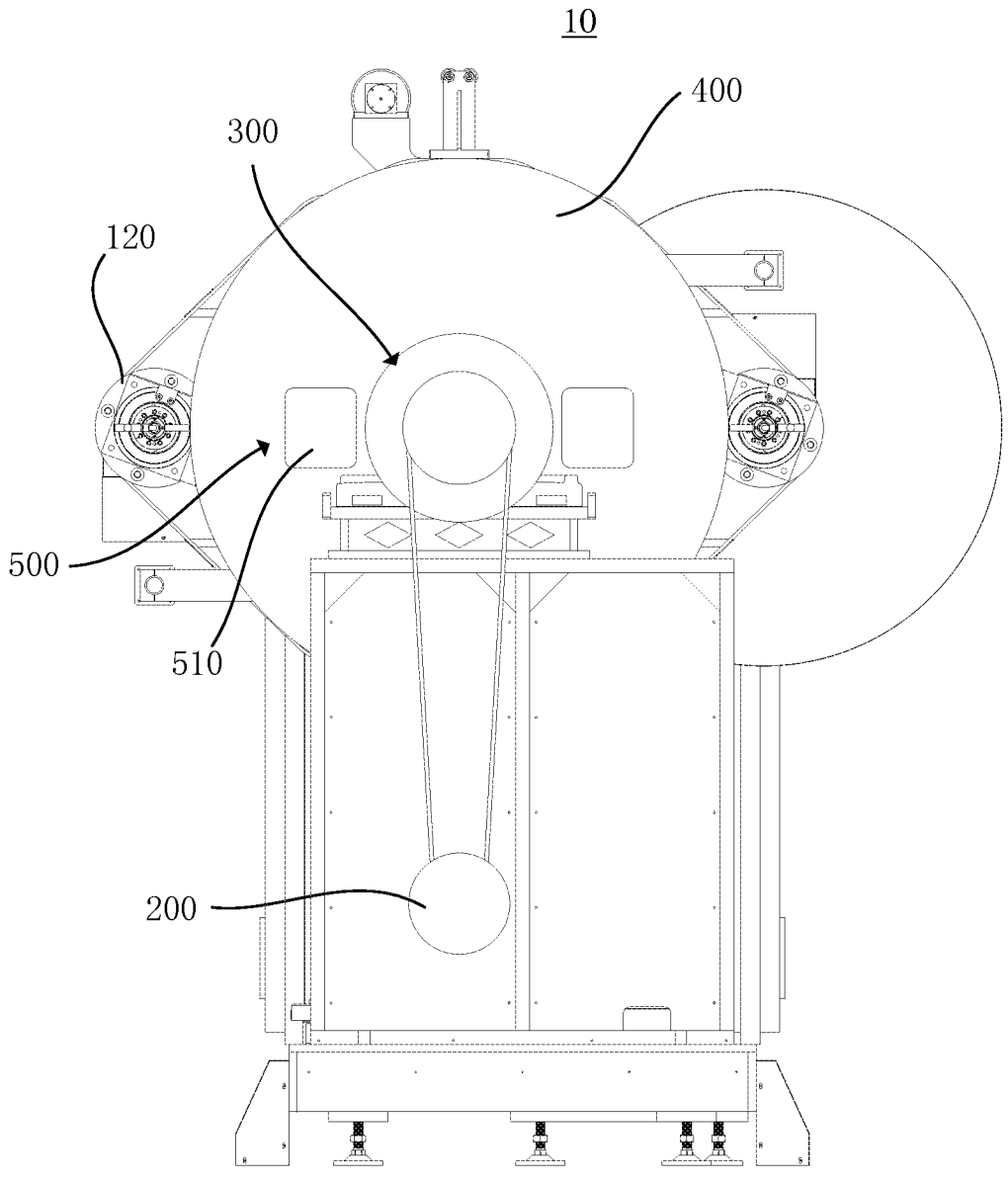
FIG. 3 is a front view of a winding and unwinding device according to some embodiments of this application.
Figure 4:
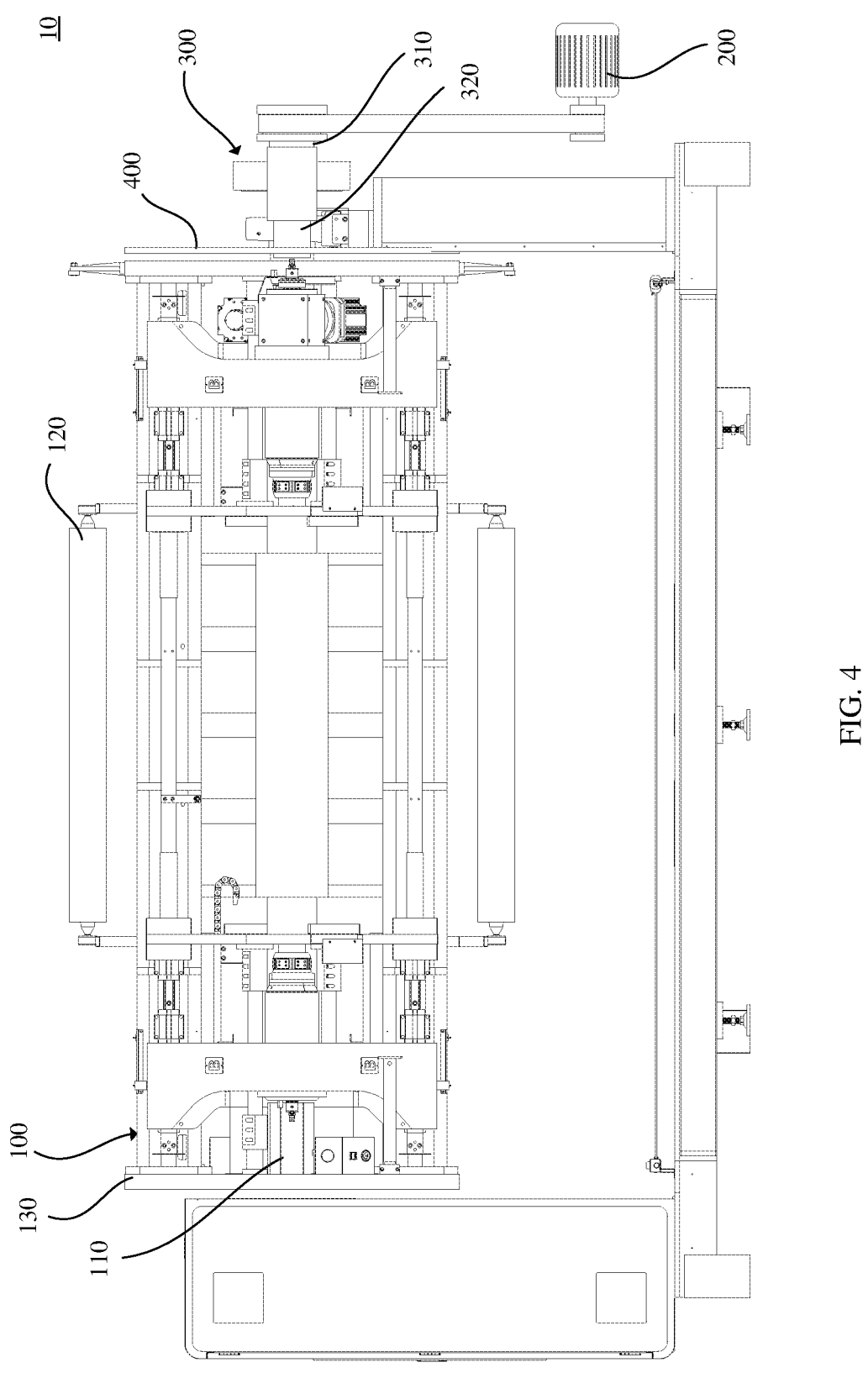
FIG. 4 is a right view of a winding and unwinding device according to some embodiments of this application.

FIG. 1 is a schematic structural diagram of a winding and unwinding device 10 according to an embodiment of this application; FIG. 2 is a top view of the winding and unwinding device 10 in FIG. 1; and FIG. 3 is a front view of a winding and unwinding device 10 shown in FIG. 1; and FIG. 4 is a right view of the winding and unwinding device 10 shown in FIG. 1. Referring to FIGS. 1 to 4, an embodiment of this application provides a winding and unwinding device 10, including a turret 100 including a rotation shaft 110 and at least one winding shaft 120, the rotation shaft 110 being parallel to the winding shaft 120; a driver 200; and a magnetic powder clutch 300, where a drive shaft 310 thereof is connected to the driver 200, and a driven shaft 320 thereof is connected to the rotation shaft 110 of the turret 100, such that the driver 200 drives the rotation shaft 110 of the turret 100 to rotate.

The turret 100 may include one or more winding shafts 120. The winding and unwinding device 10 shown in FIGS. 1 to 4 includes four winding shafts 120, but it should be understood that the winding and unwinding device 10 may also include fewer than four or more than four winding shafts 120 as required.

The driver 200 can provide a drive torque as the power source for the winding and unwinding device 10, and can include various types of motors such as a brushless direct current motor, a brushed direct current motor, an asynchronous motor, and a synchronous motor.

The magnetic powder clutch 300 can use, according to the electromagnetic principles, magnetic powder to transmit torque. The magnetic powder clutch 300 may be a dual-shaft magnetic powder clutch, a hollow shaft magnetic powder clutch, a self-cooling magnetic powder clutch, an air-cooled magnetic powder clutch, a water-cooled magnetic powder clutch, or the like.

The winding and unwinding device 10 provided in this embodiment of this application is provided with the turret 100, the driver 200, and the magnetic powder clutch 300, uses the principle that the excitation current and the transmitted torque of the magnetic powder clutch 300 form a linear relationship, and has the characteristics such as high response speed, simple structure, no pollution, no noise, no impact vibration, and energy conservation, such that after rotating to the predetermined position, the turret can stop moving without the need to cut off the power supply. Thus, the driver 200 still operates normally when the turret is fixed, avoiding damage to the driver 200.

Still referring to FIGS. 1 to 4, according to some embodiments of this application, the winding and unwinding device 10 further includes a controller (not shown), where the controller is electrically or communicatively connected to the magnetic powder clutch 300, and configured to control excitation current input to the magnetic powder clutch 300.

The connection between the controller and the magnetic powder clutch 300 may be a wired electrical connection or a communication connection, or may be a wireless communication connection. The communication connection can be established through WiFi, Bluetooth, infrared, or the like.

The excitation current input to the magnetic powder clutch 300 may be either a direct current or an alternating current. In an embodiment, the excitation current input to the magnetic powder clutch 300 is a direct current.

In the winding and unwinding device 10 provided in this embodiment of this application, with the controller disposed in the winding and unwinding device 10, the excitation direct current can be controlled to control the torque transmitted by the magnetic powder clutch 300.

Still referring to FIGS. 1 to 4, according to some embodiments of this application, the turret 100 further includes a connection bracket 130 connecting the at least one winding shaft 120 to the rotation shaft 110, and the at least one winding shaft 120 is rotatable with respect to the connection bracket 130.

The turret 100 may include a connection bracket 130 connecting one or more winding shafts 120 to the rotation shaft 110. FIGS. 1 to 4 show a connection bracket 130 connecting all four winding shafts 120 of the winding and unwinding device 10 to the rotation shaft 110.

In the winding and unwinding device 10 provided in this embodiment of this application, the connection bracket 130 being disposed on the turret 100 allows the winding shaft 120 on the connection bracket 130 to revolve around the rotation shaft 110 of the turret 100, facilitating winding and unwinding operations.

Still referring to FIGS. 1 to 4, according to some embodiments of this application, the driver 200 is connected to the drive shaft 310 of the magnetic powder clutch 300 via a chain, a belt, or a gear.

In the winding and unwinding device 10 provided in this embodiment of this application, the driver 200 can be connected to the drive shaft 310 of the magnetic powder clutch 300 via a chain, a belt, or a gear, so as to drive the driven shaft 320 of the magnetic powder clutch 300, thus driving the rotation shaft 110 to rotate.

Still referring to FIGS. 1 to 4, according to some embodiments of this application, the winding and unwinding device 10 further includes: a fixed disk 400 fixed to the rotation shaft 110 of the turret 100; and a stop member 500, where the stop member 500 is movable between a first position and a second position; in the first position, the stop member 500 is engaged with the fixed disk 400 to stop the fixed disk 400 from rotating, so as to stop the rotation shaft 110 of the turret 100 from rotating; and in the second position, the stop member 500 disengages from the fixed disk 400, to allow rotation of the fixed disk 400, so as to allow rotation of the rotation shaft 110 of the turret 100.

The fixed disk 400 may be a circular flat plate, a square flat plate, an irregularly-shaped flat plate, or the like.

In the winding and unwinding device 10 provided in this embodiment of this application, with the fixed disk 400 and the stop member 500 disposed on the winding and unwinding device 10, slippage of the turret 100 is prevented when the movement of the turret 100 is stopped. This is conducive to accurately locating the turret 100.

Figure 5:
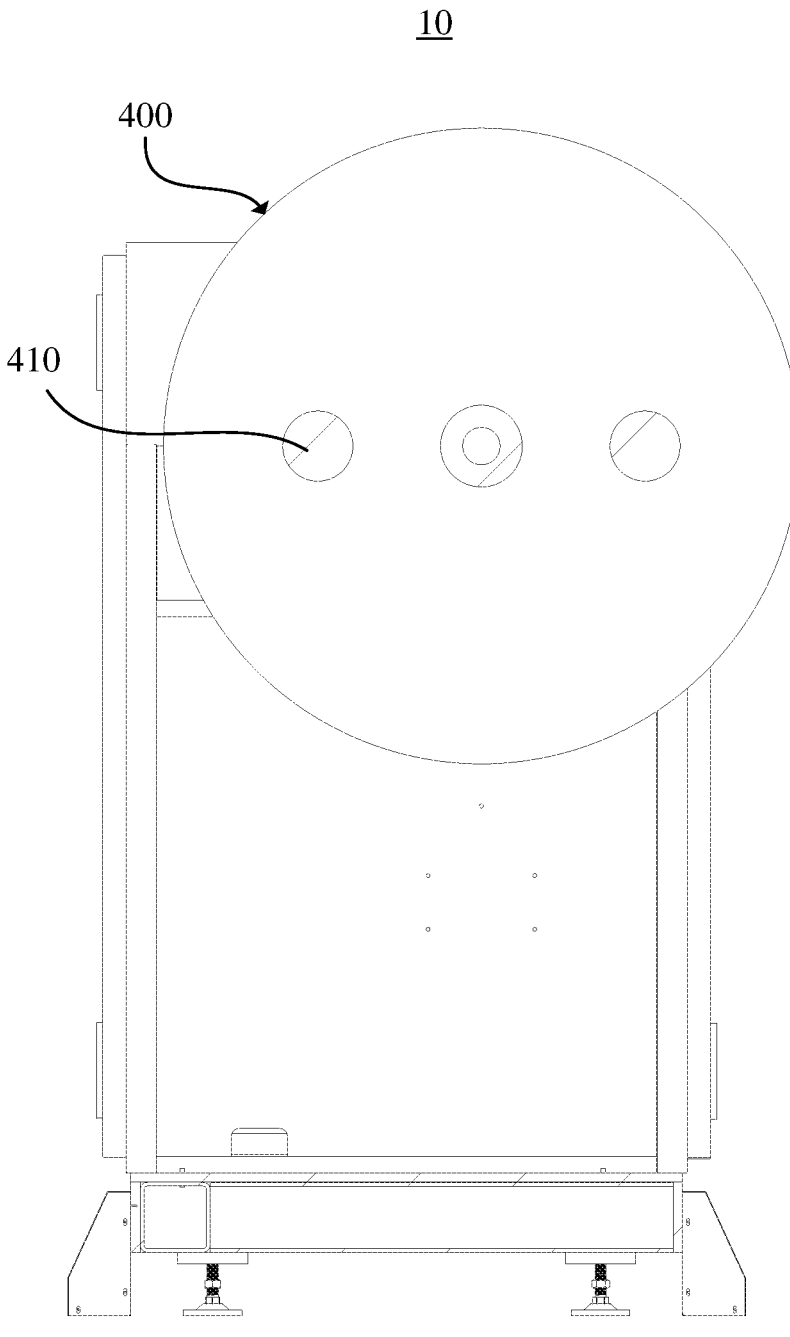
FIG. 5 is a schematic diagram of a partial structure of a winding and unwinding device according to some embodiments of this application.

FIG. 5 is a schematic diagram of a partial structure of a winding and unwinding device 10 according to an embodiment of this application. Referring to FIGS. 1 to 5, according to some embodiments of this application, the stop member 500 includes at least one stop cylinder 510, and the fixed disk 400 includes a hole 410 for accommodating a protrudable portion of the stop cylinder 510, where in the first position, the protrudable portion of the stop cylinder 510 is accommodated in the hole 410; and in the second position, the protrudable portion of the stop cylinder 510 disengages from the hole 410.

The stop member 500 can include one or more stop cylinders 510. The stop member 500 of the winding and unwinding device 10 shown in FIGS. 1 to 4 includes two stop cylinders 510.

The hole 410 of the fixed disk 400 may be a through hole or a blind hole. The hole 410 of the fixed disk 400 of the winding and unwinding device 10 shown in FIG. 4 is a through hole.

In the winding and unwinding device 10 provided in this embodiment of this application, the stop cylinder 510 is provided and the hole 410 for accommodating the protrudable portion of the stop cylinder 510 is provided on the fixed disk 400, so that the rotation of the fixed disk 400 can be controlled flexibly.

Still referring to FIGS. 1 to 4, according to some embodiments of this application, the winding and unwinding device 10 includes a pair of stop cylinders 510.

In the winding and unwinding device 10 provided in this embodiment of this application, with the pair of stop cylinders 510 disposed on two sides of the rotation axis of the rotation shaft 110 in the winding and unwinding device 10, the movement of the turret 100 can be controlled more reliably. This is conducive to accurately locating the turret 100.

Still referring to FIGS. 1 to 4, according to some embodiments of this application, the pair of stop cylinders 510 are symmetrically disposed on two sides of the rotation axis of the rotation shaft 110.

The pair of stop cylinders 510 in the winding and unwinding device 10 and the rotation axis may be on the same horizontal plane or different horizontal planes. In the winding and unwinding device 10 shown in FIGS. 1 to 4, the pair of stop cylinders 510 are disposed on a horizontal plane on which the rotation axis is located.

In the winding and unwinding device 10 provided in this embodiment of this application, with the pair of stop cylinders 510 symmetrically disposed on two sides of the rotation axis, symmetrical resistance can be applied to the fixed disk 400.

Still referring to FIGS. 1 to 4, according to some embodiments of this application, the controller is further electrically or communicatively connected to the stop member 500, to control the stop member 500 to move between the first position and the second position.

The connection between the controller and the stop member 500 may be a wired electrical connection or a communication connection, or may be a wireless communication connection. The communication connection can be established through WiFi, Bluetooth, infrared, or the like.

In the winding and unwinding device 10 provided in this embodiment of this application, the controller being electrically or communicatively connected to the stop member 500 allows the stop member 500 to be controlled more flexibly.

According to some embodiments, this application further provides a battery production system (not shown) including the winding and unwinding device 10 according to any one of the foregoing embodiments.

Figure 6:
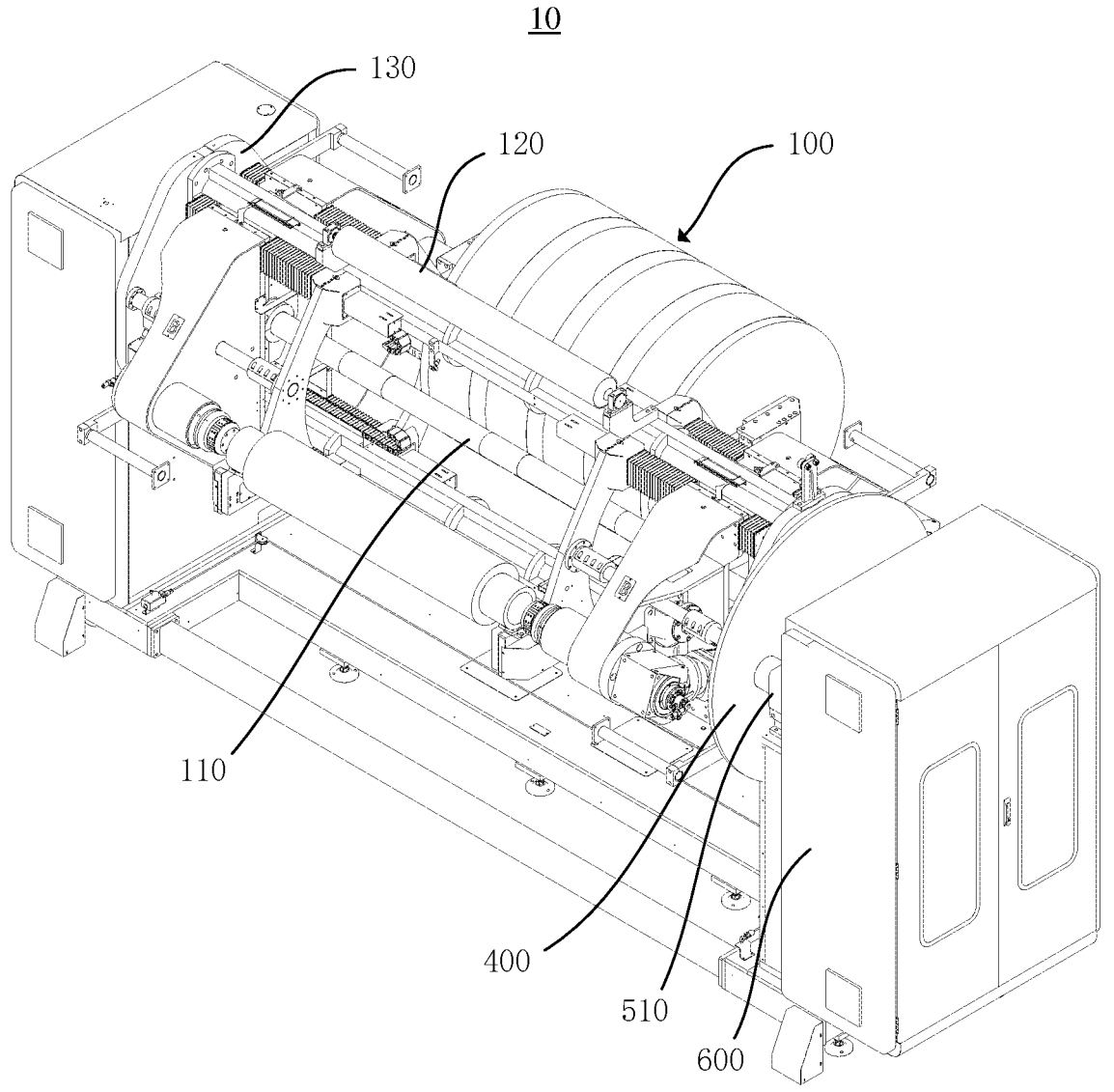
FIG. 6 is a schematic diagram of a complete structure of a winding and unwinding device according to some embodiments of this application.

FIG. 6 is a schematic diagram of a complete structure of a winding and unwinding device 10 according to an embodiment of this application.

The following further describes this application in detail with reference to FIGS. 1 to 6.

As shown in FIGS. 1 to 6, the winding and unwinding device 10 includes a turret 100 including a rotation shaft 110 and four winding shafts 120 as well as a connection bracket 130 connecting all the four winding shafts 120 to the rotation shaft 110, where the four winding shafts 120 are rotatable with respect to the connection bracket 130 and the rotation shaft 110 is parallel to the winding shaft 120; a driver 200; a magnetic powder clutch 300, where a drive shaft 310 thereof is connected to the driver 200 via a belt, and a driven shaft 320 thereof is connected to the rotation shaft 110 of the turret 100, such that the driver 200 drives the rotation shaft 110 of the turret 100 to rotate; a controller in electrical connection with the magnetic powder clutch 300 and configured to control excitation current input to the magnetic powder clutch 300; a fixed disk 400 fixed to the rotation shaft 110 of the turret 100; and a stop member 500 in electrical connection with the controller, where the controller is configured to control the stop member 500 to move between a first position and a second position.

When in the first position, the stop member 500 is engaged with the fixed disk 400 to stop the fixed disk 400 from rotating, so as to stop the rotation shaft 110 of the turret 100 from rotating; and when in the second position, the stop member 500 disengages from the fixed disk 400, to allow rotation of the fixed disk 400, so as to allow rotation of the rotation shaft 110 of the turret 100.

The stop member 500 includes a pair of stop cylinders 510 parallel to a rotation axis of the rotation shaft 110 and symmetrically disposed on two sides of the rotation axis, and the fixed disk 400 includes a pair of holes 410 each accommodating a protrudable portion of the stop cylinder 510, the hole 410 being a through hole. When the stop member 500 is in the first position, the protrudable portion of the stop member 510 is accommodated in the hole 410; and when the stop member 500 is in the second position, the protrudable portion of the stop cylinder 510 disengages from the hole 410.

The winding and unwinding device 10 further includes a housing 600 externally covering the driver 200 and the magnetic powder clutch 300 and configured to protect the driver 200 and the magnetic powder clutch 300.

It should be understood that the winding and unwinding device 10 in this application can be applied to not only the battery production system, but also any other system requiring winding and unwinding.

In conclusion, it should be noted that the above embodiments are merely intended to describe the technical solutions of this application rather than to limit this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. They should all be covered in the scope of the claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A winding and unwinding device, comprising:
a turret, wherein the turret comprises a rotation shaft and at least one winding shaft, and the rotation shaft is parallel to the winding shaft;
a driver; and
a magnetic powder clutch,
wherein a drive shaft of the magnetic powder clutch is connected to the driver, and a driven shaft of the magnetic powder clutch is connected to the rotation shaft of the turret, such that the driver drives the rotation shaft of the turret to rotate, and wherein the turret further comprises a connection bracket connecting the at least one winding shaft to the rotation shaft, and the at least one winding shaft is rotatable with respect to the connection bracket;
wherein the winding and unwinding device further comprises a controller, the controller is electrically or communicatively connected to the magnetic powder clutch, and configured to control excitation current input to the magnetic powder clutch;
wherein the winding and unwinding device further comprises:
a fixed disk fixed to the rotation shaft of the turret; and
a stop member, the stop member being movable between a first position and a second position,
wherein in the first position the stop member is engaged with the fixed disk to stop the fixed disk from rotating, so as to stop the rotation shaft of the turret from rotating; and in the second position, the stop member disengages from the fixed disk, to allow rotation of the fixed disk, so as to allow rotation of the rotation shaft of the turret.

2. The winding and unwinding device according to claim 1, wherein the driver is connected to the drive shaft of the magnetic powder clutch via a chain, a belt, or a gear.

3. The winding and unwinding device according to claim 1,
wherein the stop member comprises at least one stop cylinder, and the fixed disk comprises a hole for accommodating a protrudable portion of the stop cylinder,
wherein in the first position, the protrudable portion of the stop cylinder is accommodated in the hole; and in the second position, the protrudable portion of the stop cylinder disengages from the hole.

4. The winding and unwinding device according to claim 3, wherein the winding and unwinding device comprises a pair of stop cylinders parallel to a rotation axis of the rotation shaft and disposed on two sides of the rotation axis.

5. The winding and unwinding device according to claim 4, wherein the pair of stop cylinders are symmetrically disposed on two sides of the rotation axis.

6. The winding and unwinding device according to claim 1, wherein the controller is further electrically or communicatively connected to the stop member to control the stop member to move between the first position and the second position.

7. A battery production system, wherein the battery production system comprises the winding and unwinding device according to claim 1.

* * * * *